(12) United States Patent
De Souza Filho et al.

(10) Patent No.: US 8,388,272 B2
(45) Date of Patent: Mar. 5, 2013

(54) HIGH SPEED MILLING CUTTER WITH TAPERED PIN

(75) Inventors: Ruy Frota De Souza Filho, Letrobe, PA (US); Ronald Louis Dudzinsky, Derry, PA (US); Kenneth George DeRoche, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 810 days.

(21) Appl. No.: 12/555,870

(22) Filed: Sep. 9, 2009

(65) Prior Publication Data

US 2011/0058907 A1    Mar. 10, 2011

(51) Int. Cl.
*B23C 5/22* (2006.01)
*B23C 5/20* (2006.01)

(52) U.S. Cl. .............. 407/103; 407/104; 407/48

(58) Field of Classification Search ............ 407/33, 407/34, 36, 37, 38, 40, 43, 44, 45, 47, 48, 407/101, 103, 106; *B23C 5/20, 5/22*
See application file for complete search history.

(56) References Cited

U.S. PATENT DOCUMENTS

| | | | |
|---|---|---|---|
| 3,268,973 A | 8/1966 | Reck | |
| 3,289,272 A * | 12/1966 | Stier | 407/104 |
| 3,341,923 A | 9/1967 | Kelm | |
| 3,484,919 A * | 12/1969 | Stier | 407/77 |
| 3,577,618 A * | 5/1971 | Cashman | 407/104 |
| 3,648,341 A * | 3/1972 | Viellet | 407/104 |
| 3,887,975 A | 6/1975 | Sorice et al. | |
| 3,925,868 A * | 12/1975 | Singh | 407/104 |
| 4,066,376 A * | 1/1978 | Eckle et al. | 407/101 |
| 4,315,706 A * | 2/1982 | Erkfritz | 407/101 |
| 4,487,533 A * | 12/1984 | Wermeister | 407/105 |
| 4,507,023 A * | 3/1985 | Shikata | 407/103 |
| 4,509,886 A * | 4/1985 | Lindsay | 407/102 |
| 4,615,650 A * | 10/1986 | Hunt | 407/105 |
| 4,709,737 A * | 12/1987 | Jonsson | 144/241 |
| 5,004,378 A | 4/1991 | Arai et al. | |
| 5,031,491 A * | 7/1991 | Hofmann | 82/158 |
| 5,064,316 A * | 11/1991 | Stojanovski | 407/40 |
| 5,167,473 A | 12/1992 | Barnett | |
| 5,236,288 A * | 8/1993 | Flueckiger | 407/36 |
| 5,893,683 A * | 4/1999 | Johnson | 407/42 |

(Continued)

FOREIGN PATENT DOCUMENTS

GB    2070472 A  *  9/1981
SU    1140893 A  *  2/1985

(Continued)

*Primary Examiner* — Andrea Wellington
*Assistant Examiner* — Sara Addisu
(74) *Attorney, Agent, or Firm* — Larry R. Meenan, Esq.

(57) ABSTRACT

A milling cutter includes a shank and upper portion with an insert pocket. The insert pocket includes a bottom surface, a radial support wall and an axial support wall. A cutting insert includes a hole extending from a bottom surface. A tapered pin includes a lower portion and a tapered upper portion. A spring engages the lower portion of the tapered pin and provides an upward biasing force on the tapered pin. A center axis of the tapered pin is closer to the radial support wall than a center axis of the hole of the cutting insert such that the tapered pin exerts pressure against the hole of the cutting insert to cause one of the side walls of the cutting insert to be forced against the radial support wall of the insert pocket when the cutting insert is mounted in the insert pocket.

16 Claims, 4 Drawing Sheets

U.S. PATENT DOCUMENTS

| | | |
|---|---|---|
| 6,155,753 A | 12/2000 | Chang |
| 6,409,435 B1 | 6/2002 | Kocherovsky et al. |
| 6,702,526 B2 | 3/2004 | Gamble et al. |
| 7,063,488 B2 * | 6/2006 | Isaksson et al. ............. 407/113 |
| 7,070,363 B2 * | 7/2006 | Long et al. ................... 407/113 |
| 7,094,006 B2 | 8/2006 | Hecht |
| 7,275,894 B2 * | 10/2007 | Schlagenhauf et al. ........ 407/37 |
| 7,670,088 B2 * | 3/2010 | Andersson et al. ............ 407/33 |
| 7,959,383 B2 * | 6/2011 | Choi et al. .................... 407/105 |
| 2007/0177951 A1 * | 8/2007 | Sakamoto et al. ............. 407/40 |
| 2010/0008735 A1 * | 1/2010 | Dudzinsky et al. ............ 407/48 |
| 2011/0293381 A1 * | 12/2011 | Saji ................................ 407/40 |
| 2011/0305532 A1 * | 12/2011 | Harif .............................. 407/40 |

FOREIGN PATENT DOCUMENTS

WO    WO 2004048022 A1 *   6/2004

* cited by examiner

HIGH SPEED MILLING CUTTER WITH TAPERED PIN

BACKGROUND OF THE INVENTION

The invention relates to a cutting insert for a high-speed cutting operation, and more particularly, to a high-speed milling cutter that includes a taper pin that forces the cutting insert against the radial seating wall of the insert pocket to minimize or eliminate movement of the cutting insert and the resulting bending moment and shear forces on the insert mounting screw.

Milling cutters for performing machining operations on metallic work pieces are well known in the prior art. Such cutters typically comprise a cylindrical or disc-shaped body which is detachably connectable to a rotating drive shaft. Cutting inserts are mounted around the outer periphery of the cutter body for producing a series of metal-shaving cuts on a work piece. In operation, such milling cutters are typically rotated at speeds of several thousand rpm while a work piece is engaged with the inserts mounted on the cutter body.

Recently, there has been an increased demand for milling cutters capable of operating at rotational speeds far in excess of several thousand rpm. The advantages associated with such high-speed milling include a faster cutting action which results in a higher metal removal rate on the work piece, a reduction in the cutting forces applied to the cutting inserts by the work piece, and a smoother final cut. Such reduced cutting forces protract the operating life of the inserts, not only reducing the costs associated with insert replacement, but also the amount of downtime necessary to reorient the cutting edges of indexable inserts. The cost and time of fixturing is also reduced because higher cutting forces require more elaborate and more rigid fixturing to achieve desired accuracy.

As a result of these advantages, a high-speed milling cutter not only lowers machining costs while increasing productivity, but also enhances the quality of the final machined work piece since the cutting action is smoother, and leaves a better finish. It will be appreciated that the substantial increase in rotational speed necessary to obtain all the aforementioned advantages also results in a substantial increase in the centrifugal forces generated in the body of the cutter. Generally speaking, the centrifugal force $F_c$ is dependent upon the mass (m) of the cutter body supporting the cutting insert, the length of the radius (r) of the cutter body, and the square of the angular velocity ($\Omega$) of the body. The relationship between these parameters may be expressed in the equation $F_c=(m\Omega^2)(r)$. The fact that the centrifugal force (and hence tensile stress) on the cutter body increases with the square of the angular velocity has, up to now, posed a substantial obstacle in the development of a milling cutter capable of operating at speeds higher than several thousand rpm. A milling cutter rotating at 10,000 rpm would have 25 times more centrifugally induced tensile stress along its periphery than when it was operated at 2,000 rpm. If the same cutter is spun at 20,000 rpm, it would have over 100 times more centrifugally induced tensile stress.

In addition, the substantial increase in rotational speed necessary to obtain all the aforementioned advantages also results in a substantial increase in the centrifugal forces generated on the inserts of the cutter. Specifically, the centrifugal forces tend to cause the inserts to become unseated from the insert pocket during high-speed milling operations.

Currently, a couple of different designs reduce, but not eliminate, the bending moment encountered by the insert mounting screw. One design incorporates a rail on the insert and a corresponding groove in the cutter body. In this "Rail Design", the insert is designed to seat on the pocket floor, and the axial and radial walls of the cutting insert transfer the cutting forces to the cutter body. Because the cutting insert is seated in this manner, the rail and groove must be designed with clearances between faces. These clearances are necessary to ensure that the cutting insert seats only on the pocket floor and the axial and radial walls. The rail clearance is driven by achievable manufacturing tolerances on the insert and cutter body. Because of the clearance between the rail and groove, and the limit on movement of the cutting insert, the insert mounting screw may still experience bending moments at high rpm, but at a reduced amount. Also, a condition that could promote cutter failure at high rpm is the groove in the cutter body reducing pocket strength by reducing the cross sectional area of the material in the pocket floor.

Another design incorporates a raised boss in the pocket floor that provides additional support around the threaded section of the insert mounting screw to reduce the bending moments created at high rpm's. In this "Raised Boss Design," the cutting insert is designed with a counter bore to provide clearance for the raised boss.

Although both the "Rail Design" and the "Raised Boss Design" reduce the bending moments on the insert mounting screw, there is still a need for a high-speed milling cutter capable of operating at high speeds, for example, about 20,000 rpm that securely and positively retains the cutting inserts within the insert pockets of the cutter body. Ideally, such a high-speed milling cutter and cutting inserts should be relatively inexpensive to manufacture, and should utilize inexpensive, readily replaceable cutting inserts so as to minimize both the cost of fabrication and operation of the device.

BRIEF SUMMARY OF THE INVENTION

Briefly, according to this invention, there is provided a milling cutter comprising a shank and an upper portion having an insert pocket. The insert pocket includes a bottom surface with a threaded bore, a radial support wall and an axial support wall. The upper portion further includes a pin hole. A cutting insert is capable of being mounted in the insert pocket by a threaded fastener passing through a countersunk bore of the cutting insert. The cutting insert has a top surface, a bottom surface, and a plurality of side surfaces extending from the bottom surface to the top surface. The cutting insert further includes a tapered hole having a center axis that extends from the bottom surface of the cutting insert. A tapered pin has a tapered upper portion with a center axis and a lower portion. At least a portion of the upper portion is capable of being received in the hole of the cutting insert when the cutting insert is mounted in the insert pocket. At least a portion of the lower portion is capable of being received in the pin hole when the cutting insert is mounted in the insert pocket. The center axis of the tapered pin is offset by a distance with respect to the center axis of the hole when the cutting insert is mounted in the insert pocket. The cutting insert is mounted in the insert pocket by inserting the threaded fastener through the countersunk bore and threading the threaded fastener into the threaded bore. Rotation of the threaded fastener when mounting the cutting insert in the insert pocket causes the upper portion of the tapered pin to exert pressure against the hole of the cutting insert, thereby causing one of the side walls of the cutting insert to be forced against the radial support wall of the insert pocket.

In another embodiment, a milling cutter comprises a shank and an upper portion having an insert pocket. The insert pocket includes a bottom surface with a threaded bore, a radial support wall and an axial support wall. The upper portion further includes a pin hole. A cutting insert is capable of being mounted in the insert pocket by an insert mounting screw. The cutting insert has a top surface, a bottom surface, and a plurality of side surfaces extending from the bottom surface to the top surface. The cutting insert further includes a tapered hole having a center axis that extends from the bottom surface of the cutting insert. A tapered pin has a tapered upper portion with a center axis and a lower portion. At least a portion of the upper portion is capable of being received in the hole of the cutting insert when the cutting insert is mounted in the insert pocket. At least a portion of the lower portion is capable of being received in the pin hole when the cutting insert is mounted in the insert pocket, the center axis of the tapered pin being closer to the radial support wall than the center axis of the hole of the cutting insert. The upper portion of the tapered pin exerts pressure against the hole of the cutting insert when the insert mounting screw is threaded into the threaded bore, thereby causing one of the side walls of the cutting insert to be forced against the radial support wall of the insert pocket.

In yet another aspect of the invention, a cutting insert is capable of being mounted in an insert pocket of a milling cutter with an insert mounting screw. The cutting insert comprises a top surface; a bottom surface; a countersunk bore extending from the top surface to the bottom surface, the countersunk bore capable of allowing the insert mounting screw to pass therethrough; a plurality of side surfaces extending from the bottom surface to the top surface; and a hole extending from the bottom surface and having a center axis, the hole being tapered so as to be capable of receiving at least a portion of a tapered pin. A center axis of the tapered pin is closer to a radial support wall of the insert pocket than the center axis of the hole of the cutting insert to cause causing the tapered pin to exert pressure against the hole, thereby causing one of the side walls of the cutting insert to be forced against the radial support wall of the insert pocket when the cutting insert is mounted in the insert pocket.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
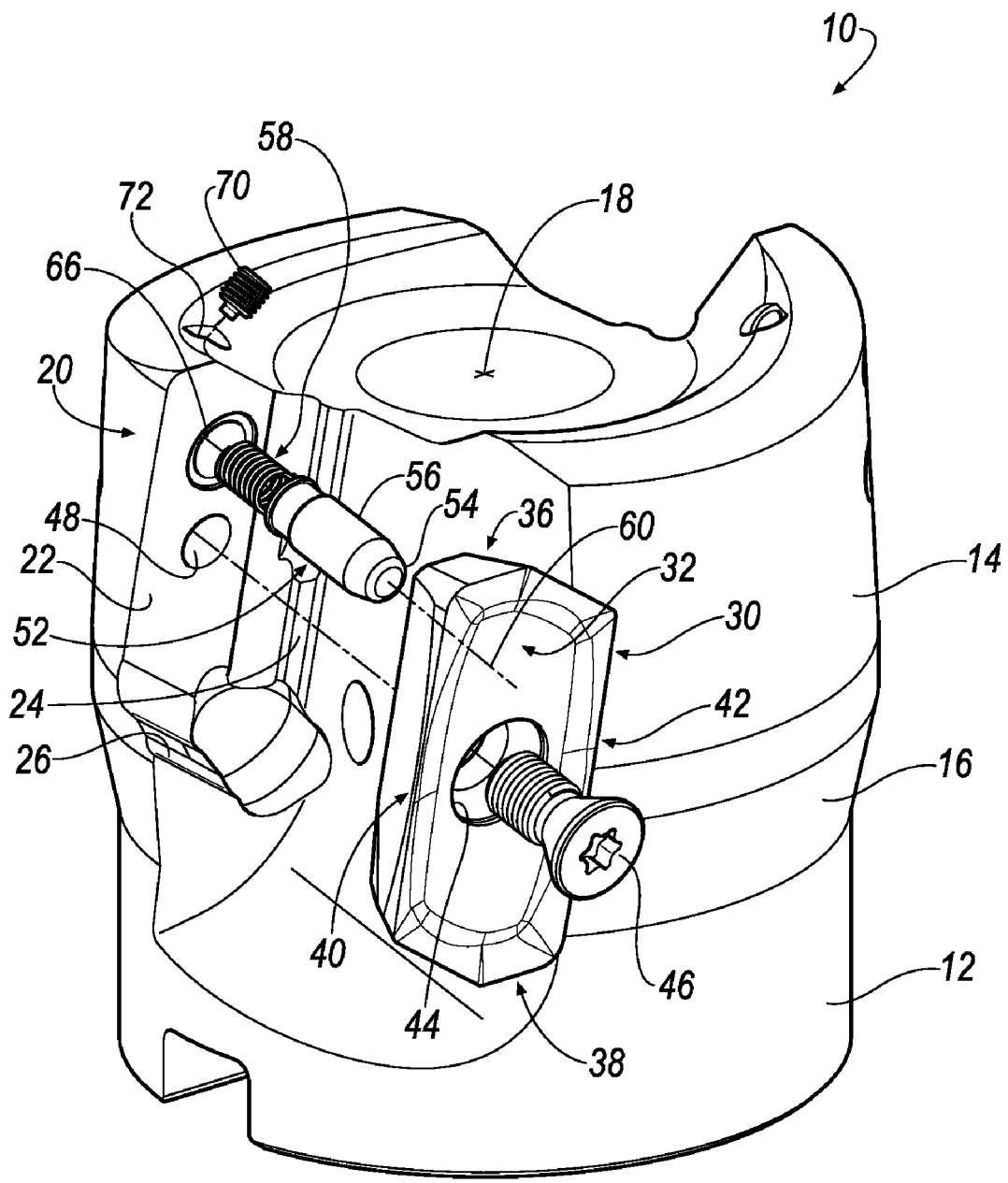
FIG. 1 is an exploded perspective view of a milling cutter with tapered pin and an indexable cutting insert according to an embodiment of the invention.

With reference now to the drawings, wherein like numerals designate like components throughout all of the several figures, FIGS. 1-6 illustrate a milling cutter, shown generally at 10, according to an embodiment of the invention. In general, the milling cutter 10 includes a shank 12, an upper portion 14 and a transition surface 16 between the shank 12 and the upper portion 14. The cutter 10 is preferably made from heat-treated steel, such as H13 tool steel, or other materials known to those skilled in the art. The specific material used will vary as a consequence of desired design characteristics of the cutter 10. The cutter 10 is rotated about an axis 18. The cutter 10 also includes an insert pocket, shown generally at 20, formed at the leading end of the upper portion 14 of the cutter 10. As shown in FIG. 1, the insert pocket 20 includes a bottom surface 22, a radial support wall 24 and an axial support wall 26.

In the illustrated embodiment, the milling cutter 10 is capable of mounting two cutting inserts 30 oriented about 180° with respect to each other within a respective insert pocket 10. However, it will be appreciated that the milling cutter of the invention is not limited by the number of indexable cutting inserts 30 that can be mounted in the insert pockets 20, and that the invention can be practiced with any desired number of cutting inserts limited by only the physical limitations of the material properties of the milling cutter.

In general, the indexable cutting insert 30 includes generally, a top surface 32, a bottom surface 34 and side surfaces 36, 38, 40, 42. In one embodiment, the topography of the surfaces of the cutting insert 30 is similar to the topography described in commonly-assigned U.S. Pat. No. 7,070,363, the entire contents of which are herein incorporated by reference. The cutting insert 30 includes a countersunk bore 44 that extends from the top surface 32 to the bottom surface 34. The countersunk bore 44 may a marginally larger diameter at the top surface 32 than its diameter at the bottom surface 34. The countersunk bore 44 is capable of receiving a threaded fastener 46, such as an insert mounting screw, and the like, that is capable of being threaded into a threaded bore 48 located in the bottom surface 22 of the insert pocket 20. Ideally, the countersunk bore 44 is centrally located in the cutting insert 30 and is substantially aligned with the threaded bore 48 of the insert pocket 20 when the cutting insert 30 is properly mounted in the insert pocket 20.

Figure 2:
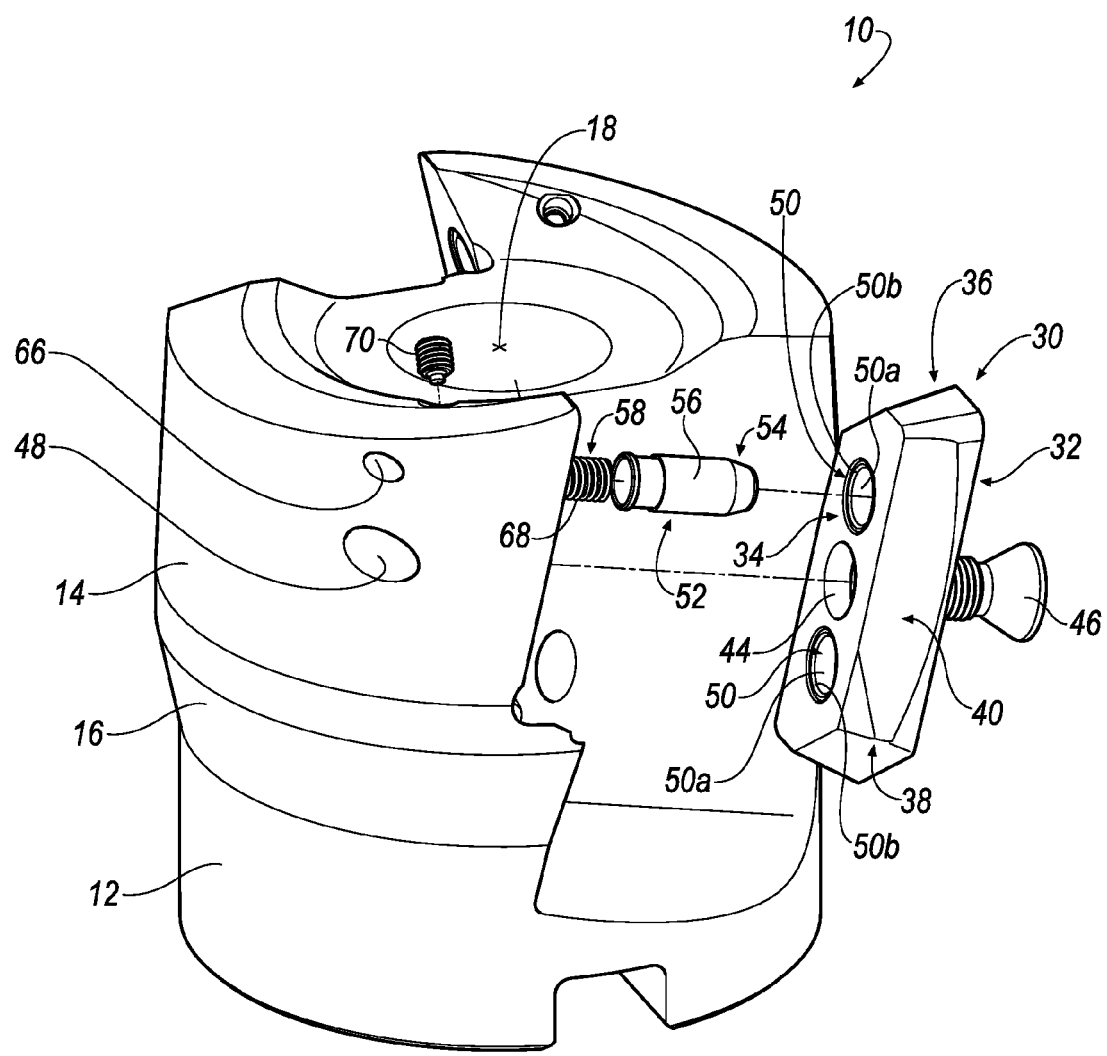
FIG. 2 is another exploded perspective view of the milling cutter with tapered pin and the indexable cutting insert of FIG. 1.
Figure 3:
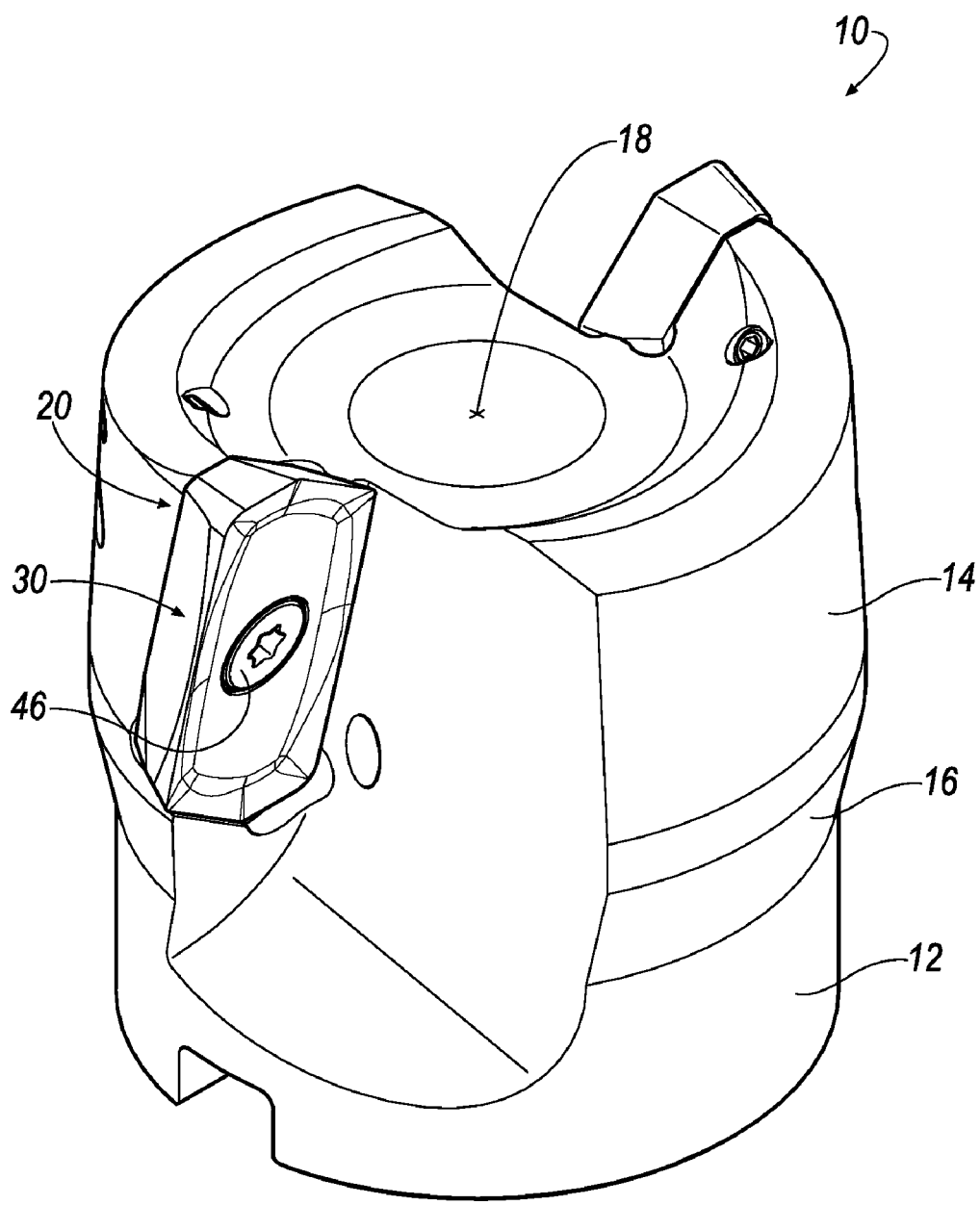
FIG. 3 is a perspective view of the milling cutter with the cutting insert mounted thereto.
Figure 4:
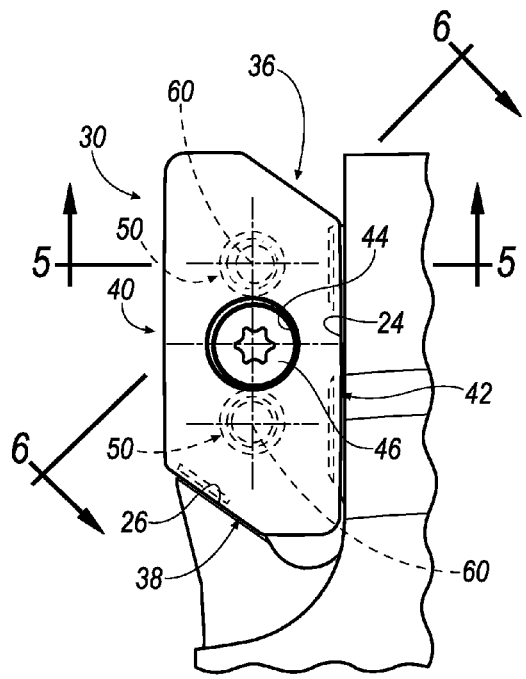
FIG. 4 is an enlarged front perspective view of the insert pocket of the milling cutter with the cutting insert mounted thereto.

The cutting insert 30 includes one or more holes 50 that extend from the bottom surface 34, but does not extend to the top surface 32, as shown in FIGS. 1 and 2. In the illustrated embodiment, the cutting insert 30 includes two holes 50 that are substantially equidistant from the countersunk bore 44 to allow the cutting insert 30 to be indexed 180 degrees for using two cutting edges. In the illustrated embodiment, the hole 50 includes a center axis 60 and is formed substantially similar to a truncated cone having a relatively larger diameter at the bottom surface 34 of the cutting insert 30. In an alternate embodiment, the hole 50 may have a substantially uniform diameter. It will be appreciated that the invention can be practiced with any desirable number of holes, depending on whether the cutting insert is indexable or not. If the cutting insert is indexable, then the number of holes should be equal to the number of indexable cutting edges of the insert. For example, if the cutting insert has four cutting edges, then the cutting insert should have four holes; one for each cutting edge.

One aspect of the invention is that the milling cutter 10 includes a tapered pin, shown generally at 52 in FIGS. 1 and 2, that provides a fixed support that prevents the cutting insert 40 from pulling from the radial support wall 24 of the insert pocket 20 at high rpm's. In general, the tapered pin 52 includes an upper portion 54 having a center axis 62 and a generally cylindrical lower portion 56. The upper portion 54 is tapered and is formed with a truncated cone shape that is substantially similar to the truncated cone shape of the hole 50 such that at least a portion of the upper portion 54 of the tapered pin 52 is capable of being received within the hole 50 of the cutting insert 30 when the cutting insert 30 is mounted within the insert pocket 20. The upper portion 54 has a slightly smaller diameter to the corresponding diameter of the hole 50 to provide some limited movement of the tapered pin 52 within the hole 50. At least a portion of the lower portion 56 of the tapered pin 52 is capable of being received in a pin hole 66 when the cutting insert 30 is mounted within the insert pocket 20. The pin hole 66 may extend through the upper portion 14 of the milling cutter 10 to allow a tool (not shown), such as a hexagonal wrench, and the like, to be inserted into a tool access 68 of the tapered pin 52, if necessary.

Figure 6:
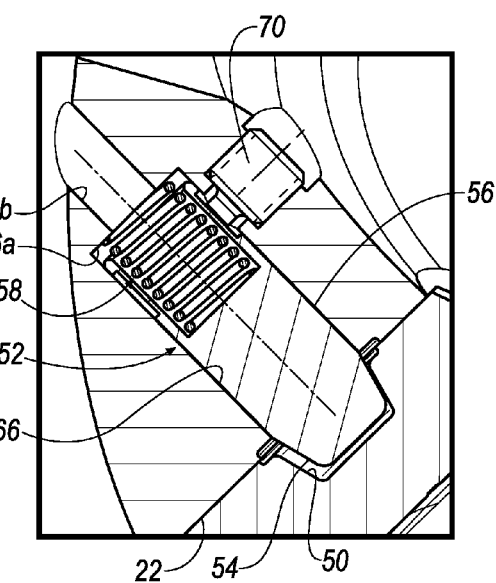
FIG. 6 is a cross-sectional view taken along line 6-6 of FIG. 4 that illustrates the tapered pin at its maximum travel forcing the cutting insert securely against the radial seating wall of the insert pocket and a set screw that prevents movement of the tapered pin.

The milling cutter 10 also includes a means for biasing the tapered pin 52 outwardly with respect to the insert pocket 20 to ensure that the tapered pin 52 will contact the cutting insert 30 when the cutting insert 30 is mounted in the insert pocket 20. In the illustrated embodiment, the biasing means comprises a spring 58 that engages the lower portion 56 of the tapered pin 52 and a bottom wall 66a of the pin hole 66 when the cutting insert 30 is being mounted within the insert pocket 20, as shown in FIG. 6. The spring 58 causes the tapered pin 52 to engage the cutting insert 30 with an adequate amount of biasing force to keep the tapered pin 52 engaging the cutting insert 30 during cutting operations.

In an alternate embodiment, the spring 58 can be omitted. In this embodiment, the pin hole 66 includes a reduced diameter portion 66b that allows a tool, such as a hexagonal wrench, and the like, to be inserted therein. The lower portion 56 of the tapered pin 52 can be threaded into the corresponding threads of the pin hole 66 to the proper location to provide an adequate amount of biasing force, similar to the location shown in FIG. 6. However, this embodiment requires the user to manually position the tapered pin 52 to the proper location and adequate amount of biasing force, whereas the embodiment shown in FIG. 6 that uses the spring 58 as the biasing means automatically locates the tapered pin 52 to the proper location and adequate amount of biasing force.

The milling cutter 10 also includes a means for limiting movement of the tapered pin 52 during machining operations. In the illustrated embodiment, the limiting means comprises a set screw 70 is provided to engage the tapered pin 52 to limit movement of the tapered pin 52 during machining operations. The set screw 70 is threadingly received in a threaded set screw hole 72, as shown in FIG. 1. Ideally, the set screw hole 72 is substantially perpendicular to the pin hole 66 to firmly hold the tapered pin 52 in place. In the illustrated embodiment, the set screw 70 engages the lower portion 56 of the tapered pin 52, as shown in FIG. 6. It will be appreciated that the invention is not limited by the use of the set screw to limit or prevent unwanted movement of the tapered pin during machining operations, and that the invention can be practiced with other means known in the art for securely holding the tapered pin in place.

To install/index the cutting insert 30 in the insert pocket 20, the spring 58 and at least a portion of the lower portion 56 of the tapered pin 52 is inserted into the pin hole 66. Then, one of the holes 50 of the cutting insert 30 is aligned with the upper portion 54 of the tapered pin 52. Once aligned, the cutting insert 30 is placed within the insert pocket 20 such that at least a portion of the upper portion 54 of the tapered pin 52 is receiving within the hole 50. Then, the insert mounting screw 46 is inserted through the countersunk bore 44 of the cutting insert 30 such that the insert mounting screw 46 can be threaded into the threaded hole 48.

Figure 5:
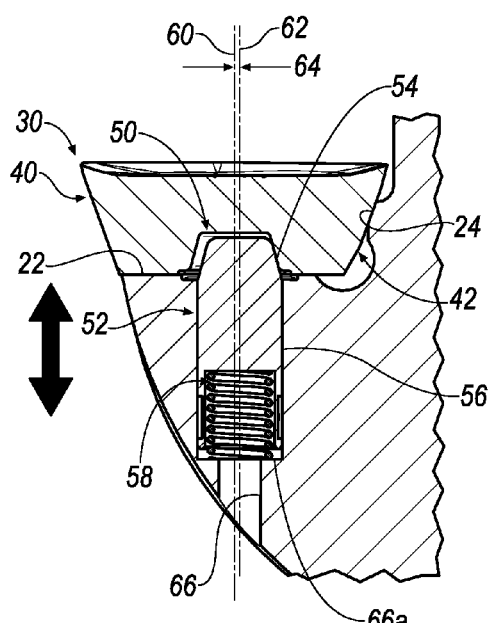
FIG. 5 is a cross-sectional view taken along line 5-5 of FIG. 4 of the tapered pin at its maximum travel forcing the cutting insert securely against the radial seating wall of the insert pocket.

As shown in FIG. 5, the center axis 60 of the hole 50 is offset by a distance 64 with respect to the center axis 62 of the upper portion 54 of the tapered pin 52 when the cutting insert 30 is being mounted in the insert pocket 20. Specifically, the center axis 62 of the upper portion 54 of the tapered pin 52 is closer to the radial support wall 24 than the center axis 60 of the hole. In one embodiment, the distance 64 is about 0.22 mm (about 0.0087 inches). In this manner, the tapered upper portion 54 of the tapered pin 52 acts as a cam as the threaded fastener 46 is rotated to mount the cutting insert 30 in the insert pocket 20.

The insert mounting screw 46 is rotated such that the upper portion 54 of the tapered pin 52 engages and moves the tapered pin 52 axially, maintaining contact between the tapered pin 52 and the hole 50 to exert a radial force against the hole 50 of the cutting insert 30, thereby forcing the cutting insert 30 in a radial direction against the radial support wall 24 of the insert pocket 20. The insert mounting screw 46 can be rotated until the tapered pin 52 exerts a maximum amount of force in the radial direction against the cutting insert 30. Then, the set screw 70 is rotated until the set screw 70 firmly engages the lower portion 56 of the tapered pin 52 to prevent unwanted movement of the tapered pin 52 during machining operations. Because the cutting insert 30 is held firmly against the radial support wall 24 of the insert pocket 20, the insert mounting screw 46 experiences less bending moments and shear during high-speed milling operations as compared to conventional milling cutters.

It should be noted that the tapered pin 52 is designed to have linear movement in the outward and inward directions (in the direction of the arrows) during installation/indexing of the cutting insert 30. In addition, the spring 58 provides an outward biasing force to ensure that the tapered pin 52 will contact the cutting insert 30 during installation of the cutting insert 30. It is the combination of the tapered upper portion 54 and the offset center axes 60, 62 along with the taper pins ability to move in the outward and inward directions that ensures, with the accumulated manufacturing tolerances, that contact between the cutting insert 30 and the tapered pin 52 will always be in the direction of the radial support wall 24 to firmly hold the cutting insert 30 against the radial support wall 24. In addition, it is assured that any gap between the tapered pin 52 and the cutter body 12 is eliminated in the radial direction so that when the centrifugal force pushes the cutting insert 30 outwardly, there is no radial movement in the tapered pin 52.

It will be appreciated that the principles of the invention can be applied to other types of cutters, such as turning, lathe, and the like.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A milling cutter, comprising:
    a shank and an upper portion having an insert pocket, the insert pocket including a bottom surface with a threaded bore, a radial support wall and an axial support wall, the upper portion further including a pin hole;
    a cutting insert capable of being mounted in the insert pocket by a threaded fastener passing through a countersunk bore of the cutting insert, the cutting insert having a top surface, a bottom surface, and a plurality of side surfaces extending from the bottom surface to the top surface, the cutting insert further including a hole having a center axis that extends from the bottom surface of the cutting insert; and a tapered pin having a tapered upper portion with a center axis and a lower portion, at least a portion of the upper portion capable of being received in the hole of the cutting insert when the cutting insert is mounted in the insert pocket, at least a portion of the lower portion capable of being received in the pin hole when the cutting insert is mounted in the insert pocket, the center axis of the tapered pin being offset by a distance with respect to the center axis of the hole when the cutting insert is mounted in the insert pocket, wherein the cutting insert is mounted in the insert pocket by inserting the threaded fastener through the countersunk bore and threading the threaded fastener into the threaded bore, and wherein rotation of the threaded fastener when mounting the cutting insert in the insert pocket causes the upper portion of the tapered pin to exert pressure against the hole of the cutting insert, thereby causing one of the side walls of the cutting insert to be forced against the radial support wall of the insert pocket.

2. The milling cutter of claim 1, wherein the center axis of the tapered pin is closer to the radial support wall of the insert pocket than the center axis of the hole of the cutting insert.

3. The milling cutter of claim 1, further comprising means for biasing the tapered pin outwardly with respect to the insert pocket to ensure that the tapered pin will contact the cutting insert when the cutting insert is mounted in the insert pocket.

4. The milling cutter of claim 3, wherein the biasing means comprises a spring.

5. The milling cutter of claim 1, further comprising means for limiting movement of the tapered pin during machining operations.

6. The milling cutting of claim 5, wherein the limiting means comprises a set screw that engages the lower portion of the tapered pin.

7. The milling cutter of claim 1, further comprising a transition surface between the upper portion and the shank.

8. The milling cutter of claim 1, wherein the cutting insert is indexable.

9. A milling cutter, comprising:

a shank and an upper portion having an insert pocket, the insert pocket including a bottom surface with a threaded bore, a radial support wall and an axial support wall, the upper portion further including a pin hole;

a cutting insert capable of being mounted in the insert pocket by an insert mounting screw, the cutting insert having a top surface, a bottom surface, and a plurality of side surfaces extending from the bottom surface to the top surface, the cutting insert further including a hole having a center axis that extends from the bottom surface of the cutting insert; and a tapered pin having a tapered upper portion with a center axis and a lower portion, at least a portion of the upper portion capable of being received in the hole of the cutting insert when the cutting insert is mounted in the insert pocket, at least a portion of the lower portion capable of being received in the pin hole when the cutting insert is mounted in the insert pocket, the center axis of the tapered pin being closer to the radial support wall than the center axis of the hole of the cutting insert, wherein the upper portion of the tapered pin exerts pressure against the hole of the cutting insert when the insert mounting screw is threaded into the threaded bore, thereby causing one of the side walls of the cutting insert to be forced against the radial support wall of the insert pocket.

10. The milling cutter of claim 9, further comprising means for biasing the tapered pin outwardly with respect to the insert pocket to ensure that the tapered pin will contact the cutting insert when the cutting insert is mounted in the insert pocket.

11. The milling cutter of claim 10, wherein the biasing means comprises a spring.

12. The milling cutter of claim 9, further comprising means for limiting movement of the tapered pin during machining operations.

13. The milling cutting of claim 12, wherein the limiting means comprises a set screw that engages the lower portion of the tapered pin.

14. The milling cutter of claim 9, further comprising a transition surface between the upper portion and the shank.

15. The milling cutter of claim 9, wherein the cutting insert is indexable.

16. A cutting insert capable of being mounted in an insert pocket of a milling cutter with an insert mounting screw, comprising:

a top surface;

a bottom surface;

a countersunk bore extending from the top surface to the bottom surface, the countersunk bore capable of allowing the insert mounting screw to pass therethrough;

a plurality of side surfaces extending from the bottom surface to the top surface; and a hole extending from the bottom surface and having a center axis, the hole being tapered so as to be capable of receiving at least a portion of a tapered pin, wherein a center axis of the tapered pin is closer to a radial support wall of the insert pocket than the center axis of the hole of the cutting insert to cause the tapered pin to exert pressure against the hole when the insert mounting screw is threaded into a threaded bore of the insert pocket, thereby causing one of the side walls of the cutting insert to be forced against the radial support wall of the insert pocket.

* * * * *